May 7, 1940.　　　　A. F. HEGENBERGER　　　　2,199,402
RADIO SYSTEM AND METHOD OF NAVIGATION
Filed Jan. 12, 1935　　　3 Sheets-Sheet 1

INVENTOR
ALBERT F. HEGENBERGER

May 7, 1940.  A. F. HEGENBERGER  2,199,402
RADIO SYSTEM AND METHOD OF NAVIGATION
Filed Jan. 12, 1935   3 Sheets-Sheet 3

INVENTOR
ALBERT F. HEGENBERGER
BY
ATTORNEYS

Patented May 7, 1940

2,199,402

UNITED STATES PATENT OFFICE 2,199,402

RADIO SYSTEM AND METHOD OF NAVIGATION

Albert F. Hegenberger, Dayton, Ohio

Application January 12, 1935, Serial No. 2,887

26 Claims. (Cl. 250—11)

(Granted under the act of March 3, 1883, as amended April 30, 1928; 370 O. G. 757)

The invention described herein may be manufactured and used by or for the Government for governmental purposes, without the payment to me of any royalty thereon.

This invention relates in general to radio systems of navigation and method of landing of an aircraft, and more in particular to a system embodying an arrangement of an airdrome and two radio transmitting stations positioned in a vertical plane passing through said airdrome and spaced a predetermined distance relative to each other and to a point that is in said plane and within said airdrome with a radio direction finding apparatus carried by a mobile craft, the said apparatus cooperating with these two stations to indicate the bearing of said craft relative to said stations and to said airdrome and the instant when said craft passes over one or the other of the positions in space corresponding to the position of said transmitters.

Major Doolittle, with the aid of the facilities of the Guggenheim Fund for the promotion of aeronautics, had demonstrated in September 1929 that it is possible to take off, fly and land an aircraft when the pilot's cockpit is completely enclosed. In accordance with the system employed by Major Doolittle a radio direction visual beacon was positioned a predetermined distance from the point of landing and the beam directed in a predetermined direction. The pilot, with the aid of his directional gyroscope which was set so as to read the same as the magnetic compass, together with the aid of his radio receiving and sending apparatus and knowing the bearing of the beam path with respect to the magnetic north, was able to detect the beam path. The airplane was equipped with other standard engine and navigation instruments and among these were an artificial horizon, a bank and turn indicator, an altimeter, and a rate of climb indicator. With the use of these instruments the pilot was able to take off from the field, fly along the path of the beam for a timed predetermined distance, execute a timed 180° turn and return along the beam path all the while timing his approximate speed relative to the ground so that in this manner he knew his approximate relative position of approach to the radio direction beacon and he was able to determine when the airplane could be lowered to a safe predetermined altitude that was free from obstructions. The airplane was held at said altitude until the reed of the radio visual indicator stopped vibrating whence he knew that the airplane had passed over the radio beacon station. At this point the airplane was held with the wings level, the flight path of the airplane in continuation of the beacon path was maintained by the directional gyroscope, and the speed of the airplane was reduced first to a glide and then increased slightly above the stalling speed until the landing was accomplished.

Although the work that was done by Major Doolittle and the system that he employed represents a measure of success unestimable in its contributing value towards overcoming the hazards of flying when visibility is low, nevertheless this was not practical for it primarily did not include a means of indicating definitely without the use of the compass and without knowledge of the bearing of the beacon path with respect to the magnetic north when the path of the flight, as it approached the beacon station was in coincidence with the line joining the beacon and the point where the airplane was supposed to land. Major Doolittle, in his paper presented to the National Aeronautic Meeting of the Society of Automotive Engineers at St. Louis, February 18, 19 and 20, 1930, stated, "In this case, knowing the exact direction of the beam facilitated the work as it was immediately known when a wrong direction was being flown even though the reed indication showed that the pilot was off his course." Furthermore, it lacked a means for definitely indicating to the pilot the point in his flight path where it was safe to lower the altitude of the airplane.

Applicant is the first to have accomplished a "blind flight unaccompanied by a safety pilot." In this flight, applicant took off from a landing field, flew about and returned to the landing field while his vision to the outside of the cockpit of the airplane was completely obscured. This demonstration was made May 9, 1932. Since then, other officers of the United States Army Air Corps have been given training in blind flying and with the aid of the present system have made blind landings.

In the drawings:

Fig. 8 is a diagrammatic view showing a flight path of an airplane between two stations when the wind direction does not coincide with the through line thereof and the relative indications of the instruments employed for effecting said flight path.

Fig. 9 is a diagrammatic view showing the flight path of an airplane in a direction away from the airdrome and in the opposite direction towards the airdrome, the relative indications of the instruments employed for determining direction of wind with respect to the through line and also the relative indications of the instruments in obtaining the desired correction for the wind.

In accordance with the present invention and as illustrated herein, two radio transmitting stations A and B, that are preferably mobile so that they may be positioned in alignment and in the direction of the wind, constitute the ground equipment and certain essential instruments for blind flying, such as a gyro horizon, a directional gyro, a tachometer, an airspeed indicator and altimeter together with a radio direction finder or homing apparatus and marker beacon indicator constitute the airplane equipment.

In carrying out this invention, radio direction finders of various forms may be employed but the uni-directional finder of the type disclosed in the Kruesi Patent No. 1,863,945, granted July 26, 1932, is preferred. By the use of this patented device the direction of movement of the airplane relative to a straight line between the airplane and the transmitting stations is indicated upon a direction indicating instrument in the form of a voltmeter or ammeter 10 that is mounted on the instrument board 12 (Fig. 1) of the airplane cockpit.

In actual practice the volume of the receiving apparatus is normally or automatically adjusted to such a value that, as the airplane approaches the transmitting station with which the apparatus is tuned in, the sensitivity of the needle, i. e., the amount of deflection per degree of deviation of heading of the airplane, is maintained substantially constant for any given angular deviation of the heading of the airplane with respect to the through line. The bearing is indicated when the needle of the voltmeter is at the zero central position and any angular deviation of the longitudinal axis of the airplane or the loop antenna (not shown) of the receiving apparatus to the right or left of said alignment will cause a corresponding directional deflection of the needle. By selectively tuning in first one radio transmitting station and then the other, and if the needle is at the central zero position for both readings, the pilot knows that he is in alignment therewith. If, however, there is a difference in the readings, he knows that the airplane is out of alignment and by observing the sense and the extent of diversion of the needle from the zero position, the airplane can be maneuvered into the true direction for alignment.

Figures 2, 3, 3A, 4, 7:
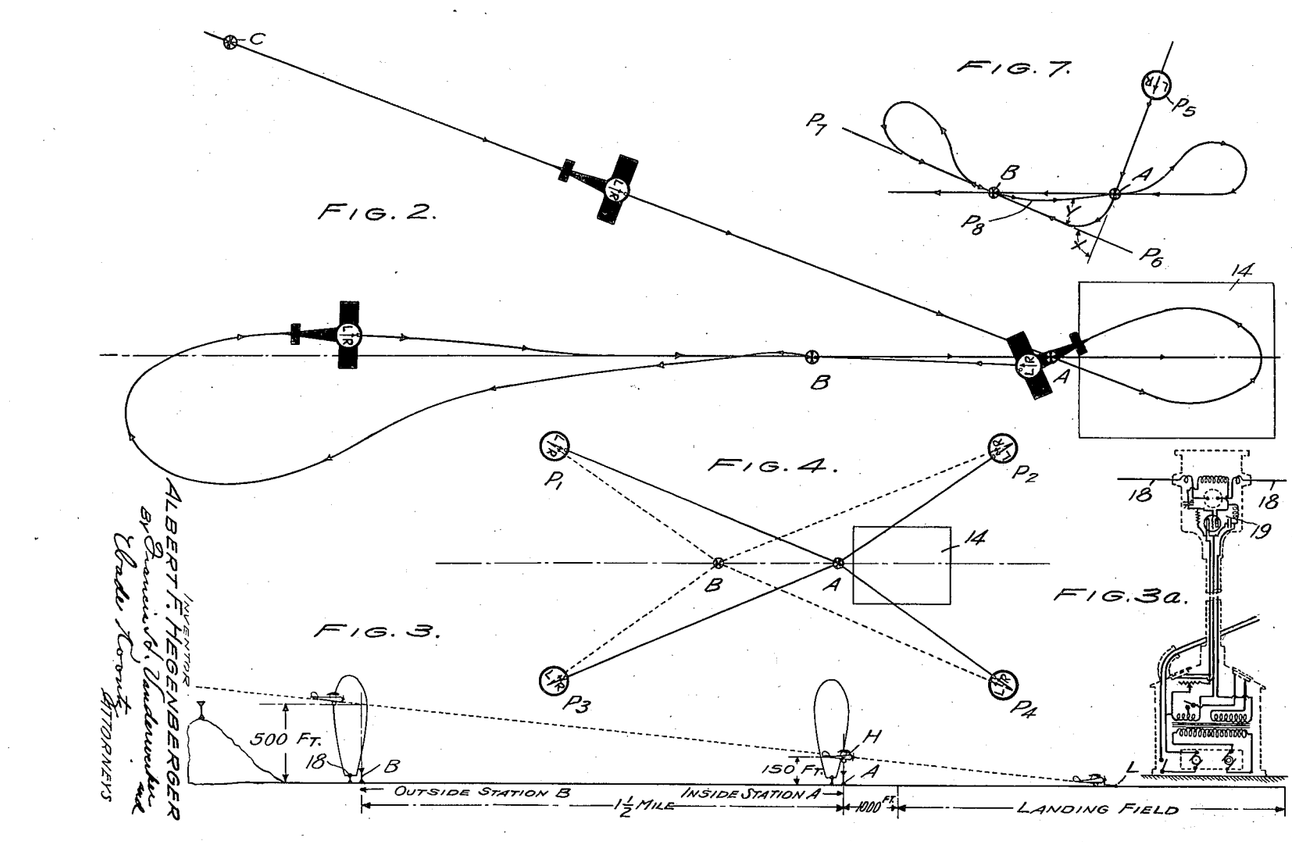
Fig. 2 is a view showing an airdrome with two spaced radio transmitting stations disposed in alignment and in a desired direction with respect to the airdrome, showing also a diagram of the flight path of an airplane in the approach from a remote station to the vicinity of the airdrome and a representative flight path of the airplane for effecting alignment with the two stations.
Fig. 3 is an elevational diagrammatic view showing the relative arrangement of the marker beams or projectors and the radio transmitting localizing stations with respect to each other as well as the boundary of the airdrome and also the landing flight path of the airplane over these stations and onto the airdrome.
Fig. 3a shows a suitable ultra-high frequency projector having its antenna properly arranged with respect to ground for producing a fan-shaped beam at right angles to its length.
Fig. 4 is a diagram showing four different positions and directions of the airplane with two to the right and two to the left of the line passing through the two stations with the bearings from each of these positions to the two stations being indicated by solid and dotted lines.
Fig. 7 is a diagrammatic view illustrating the flight path of an airplane in aligning with the line passing through the two radio transmitting stations in accordance with a further embodiment of my invention.

Referring to Fig. 3 of the drawing, I indicate a representative airdrome and the letters A and B designate two radio transmitting stations, Station A being termed the "inner" station and Station B the "outer" station. The radio transmitters and their respective antennae (not shown) are of the well-known, non-directional type. It is preferable that both stations simultaneously transmit radiant energy of differed wave lengths and that their wave lengths be not far apart so that rapid tuning from one station to the other may be effected. Accordingly, the inner transmitting station is provided with a wave length of 500 kc. whereas the outer transmitting station is provided with a wave length of 525 kc.

The inner station A is positioned a predetermined distance from a point L on the desired direction of the landing path on the airdrome. The position of the inner station A, the approximate predetermined position H of the airplane above the station A, and the approximate predetermined point of landing L constitute three vertices of a vertical right triangle in which the side AL represents the desired landing direction, the side AH represents the desired altitude and the side or hypotenuse HL represents the landing path of the airplane.

The distance that the inner station A is positioned from the point of landing depends primarily upon the maximum possible gliding angle of the airplane and upon the nature and height of obstructions in the immediate vicinity of the airdrome. Where, as indicated in Fig. 3, the desired height of the airplane, prior to effecting a landing, is about 150 feet, the distance of the inner station from the boundary of the landing field will be about 1,000 feet.

The distance that the outer station B is positioned from the inner station A should not be less than the distance required for the pilot to lower the altitude of the airplane by properly reducing the speed of the airplane, while flying between said stations to a speed that is essentially above the stalling speed of the airplane. The maximum distance between these stations should not be so great that the airplane, due to drift in the interim of travel between the two stations, will not have too great a change in heading or drift angle from the aligned course when it passes over the inner station. This distance as indicated in Fig. 3 is about one and one half miles.

Figure 5:
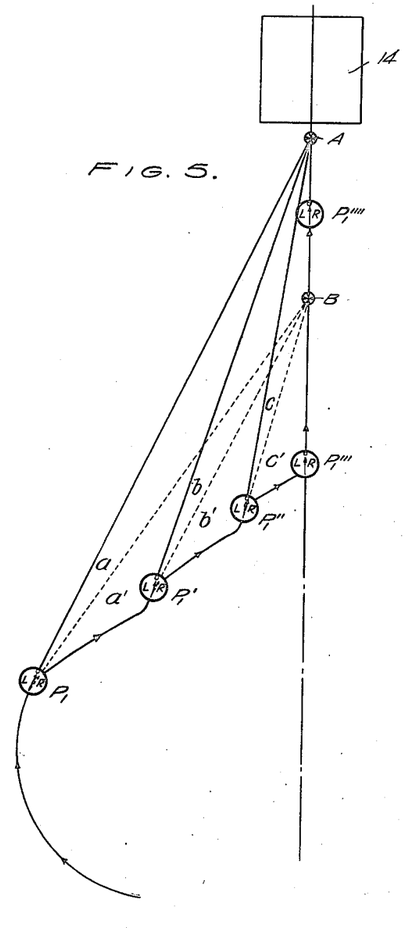
Fig. 5 is a representative arrangement of the flight path of an airplane in effecting alignment of the airplane with the line passing through the two stations and when positioned to the left, in accordance with one embodiment of my invention.

Referring to Fig. 5 in which stations A and B are shown in alignment, it will be seen that, if in tuning first station A and aligning the axis of the airplane so that the needle of the ammeter 10 will read zero and then in tuning station B and the needle 16 remains at the central zero position, the airplane will be positioned at a point P''', on the line joining the two stations with the axis of the airplane in coincidence therewith. If, however, the needle is diverted from the zero central position when station B is tuned in, the longitudinal axis of the airplane will not be in coincidence with the straight line passing through said stations and depending upon which of the two stations it is desired to pass over first, the airplane will be steered in the same sense or in an opposite direction of deviation of the needle from zero in order to effect this alignment. Assuming that it is desired to head the airplane so that it will first pass over station B, the airplane will be steered in the same sense as the deviation of the needle from zero position, or if it is desired to first pass over station A, then the airplane will be steered in an opposite sense from the direction of deviation of the needle from zero.

The airplane can be aligned with the two stations A and B irrespective of the position of the airplane out of alignment, if the airplane is successively deviated after each reading of the deviation or bearing of the one station with respect to the bearing of the other station, by an angle that is greater than the included angle between said bearings, until the included angle between the two bearings is zero which is indicated when no deflection from the central zero position of the ammeter takes place after tuning in both stations in quick succession.

With this system various means may be used to ascertain the instant of passing over each of said stations. Use may be made of the characteristic movement of the ammeter needle of this particular radio receiving apparatus relative to the movement of the airplane. Since the axis of the airplane and the needle are in coincidence only when the airplane is in the direction of the station, this movement will be such that, as the airplane approaches the station the needle will move in a direction opposite to the direction into which the airplane is turned, but, will move in the same direction as that into which the airplane is turned when headed away from the station.

Since it is necessary in actual practice to cause the airplane to hunt or fish-tail by the use of the rudder in approaching the station, the needle will be deflected in a sense opposite to the sense of direction into which the airplane is turned. It will, therefore, be obvious that, if as above described, this relative motion between needle and rudder reverses, it will indicate the instant of passing over the station.

Earphones (not shown) that are connected to the output terminals of the receiver may be used as an additional means for indicating instant of passing over the station, since the signal level immediately over the station is relatively large even though the intensity may be reduced by the volume control.

There may also be provided a marker beacon at the stations or at the boundary of the airdrome and the airplane may be equipped with means for receiving the signal emitted by the marker beacons.

It is found in actual practice, in effecting the blind landing, it is important to know in advance that the airplane is about to pass over the particular station for which it is heading. The pilot will thus be prepared to execute, immediately after passing each station and in a minimum of time, such operations as are necessary for the precision piloting of the airplane. The operations to be performed by the pilot after alignment of the axis of the airplane with the through line of the two stations and immediately after passing over the outer station B are many, and consist in obtaining a new throttle setting; in obtaining a new longitudinal balance setting for the airplane; in tuning the radio compass to the inner station; in checking the flight instruments and in correcting for any angular deviation of the heading of the airplane relative to the through line as well as for improper longitudinal and lateral attitudes of the airplane.

Figure 1:
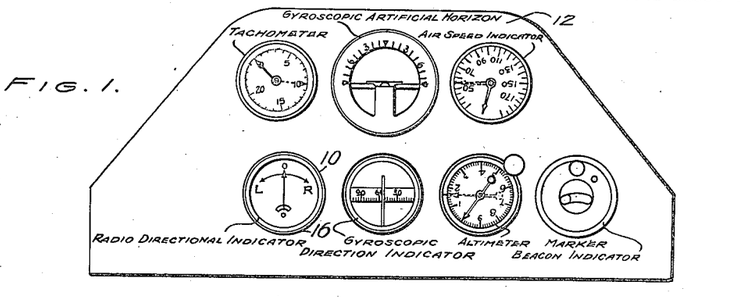
Fig. 1 is a front elevational view of an instrument panel showing several different instruments that may be employed in making blind flights and landings.

It is also found in actual practice that it is difficult, under certain circumstances, to maintain the established alignment of the axis of the airplane with the through line of the two transmitting stations A and B after passing over one and heading toward the other. Thus, notwithstanding the fact that, in effecting this process of landing, there is provided in the airplane a suitable means, such as a directional gyroscope, as shown in Fig. 1, for indicating the angular relation of the axis of the airplane with respect to the established through line. For example, when a slight shift in the direction of the wind takes place the airplane, assuming that it is headed for the inner station A, will be progressively displaced laterally and angularly until the heading of the airplane is in the direction of the wind designated by arrow W, whence the airplane will then move in a straight line towards the inner station but not along the through line with the result that the landing path of the airplane will not be in coincidence with the through line or desired landing path on the airdrome.

A further desideratum in this regard is that, unless the pilot of the airplane is extremely accurate in keeping the airplane properly headed in traveling from one station to the other as required, especially immediately prior to effecting the landing, a condition which is not entirely practical in rough weather, even when there has been no slight shifting of the wind direction, the airplane will be caused to be displaced angularly and laterally. As has already been indicated above, the pilot may endeavor to correct this off-course condition by "fish-tailing" or zig-zagging the airplane across the through line until the gyro compass reading and that of the radio compass needle have the identical relation as that indicated when the alignment of the airplane axis and through line was established at the instant of passing over the outer station.

It will be obvious that, if lateral and angular displacement of the airplane with respect to the through line takes place at a time shortly in advance of passing over the inner station, and if the pilot attempts to satisfy the desired relation of the directional gyro and radio compass needle by a "fish-tail" or zig-zag maneuver, the airplane obviously will pass over the station before the maneuver is accomplished and will head in an undesired direction.

Suitable means are, therefore, provided on the ground and in the airplane for signalling the pilot at the time when he has arrived at a predetermined distance from the station over which he is about to pass to thereby allow for the required time to coordinate mind and muscle in carrying into effect the next succeeding step or steps after passing that station in the process of landing.

In the early development of this system a General Electric Sonic Boundary Marker was positioned adjacent each of the inner and outer transmitting stations and arranged so that a concentrated, sharply defined, fan-shaped sound beam was located transversely to the through line and, as the airplane moved into the zone occupied by the sound, the pilot detected the sound either by ear or microphone pickup and determined the relative position of the airplane more or less by the intensity of the sound.

Any well-known type of ultra-high frequency projector may be employed that will produce a sharp beam for defining a zone in space, the effective boundaries of which extend a definite distance forward of the localizing station, and intersect the through line of said stations along a line of approximate predetermined length. This line of intersection will have an effective length dependent upon the sharpness of the beam and the sensitivity of the instrument and is more or less arbitrarily chosen to meet the conditions of the speed of the airplane and the time required to bring the airplane into the desired maneuver after the airplane enters the zone and the signal received. If desired two separate marker beacons may be employed with each station, one forward and the other rearward, or the marker beacon may produce a beam that will extend a definite distance forward and rearward of the guiding stations.

An ultra-high frequency projector of the type shown in Fig. 3A may be employed for this purpose. The arrangement illustrated therein shows an excitation aerial in the form of a doublet antenna 18, that is inductively coupled to a well-known oscillatory circuit, such as diagrammatically shown at 19 in Fig. 3A. The arrangement of the projector is such that the doublet antenna is in a horizontal position with its length along the through line and elevated above the ground one-fourth wave length. With the ground as a reflecting medium for the doublet antenna the projector will produce a fan-shaped beam, the contour of which will be more or less free from lobes.

Any well-known type of receiver that is tunable to the frequency of the projector may be employed for detecting the transmitted signal, for example, the receiver described in U. S. Patent No. 1,905,332. For indicating the receiver signal to the pilot use may be made of an ammeter or neon light that is suitably connected to the output of the receiver. The ammeter or light is preferably located on the instrument board of the airplane, as shown in Fig. 1.

Since the distance between the two stations is, as heretofore stated, a predetermined value, it will be necessary that the airplane when passing over station 14 be at approximately a predetermined altitude so that in throttling the engine to obtain a speed slightly in excess of the stalling speed, the airplane cruising speed will be decelerated to slightly above the stalling speed when it reaches the station 12. The speed of the airplane immediately prior to passing over station 12 and its altitude thereabove will depend to a great extent upon the type of airplane.

The position of the airplane, with regard to one side or the other of the line that passes through the two stations and the airdrome, may be determined without the aid of a magnetic compass or knowledge of the bearing of the line connecting the two stations with respect to the magnetic north, by observing the sense of deviation of the needle from the central zero position when tuning the receiving set from one radio station to the other.

It follows from this procedure that when the needle is deflected to the left when tuning in on station A, that the landing path on the airdrome is to the right of the bearing from any position of the airplane to station A regardless of the sense of direction of heading of the airplane to the latter station. A simpler procedure and rule that may be followed to determine on which side of the airplane the landing path on the airdrome is located would be by first tuning in and getting a bearing on station A, and then tuning in station B to determine its direction with respect to said bearing, in which case the landing path will always be in the direction of deviation of the needle from the zero position to the position it assumes when the receiving set is tuned from A to B.

This will be more apparent by referring to Fig. 4 in which the letters $P_1$, $P_2$, $P_3$ and $P_4$ designate four different positions of the airplane with the airplane heading from each of these positions in the direction of the inner station A, as indicated by lines $AP_1$, $AP_2$, $AP_3$ and $AP_4$ respectively, or by the zero position of the pointer on the ammeter. Assuming that the airplane is heading toward station A from any of these points and it is desired to know on what side of the airdrome or that portion of the through line that lies thereon the airplane is located, it is merely necessary to observe which side of the zero position on the ammeter the needle will deflect when station B is tuned in. For example, if the airplane is to the right of the through line as viewed in the direction from B to A, the needle will deflect to the left, when tuning in on station B from position $P_3$ or $P_4$, and if the airplane is to the left of this line when viewed in the same direction, the needle will deflect to the right, when tuning in on station B from position $P_1$ or $P_2$.

One method of alining the longitudinal axis of the airplane with the through line AB is illustrated in Fig. 5.

The direction of one station with respect to the bearing between the airplane and the other station is determined in accordance with the illustration by first tuning in station A and then tuning in station B. If the relative arrangement of the two stations A and B and the airdrome are known in advance by determining on which side of the through line the one is with respect to the other, the position of the airplane with respect to the bearing line between the one station and the airplane will be apparent. Assuming that the airplane is at position $P_1$ on the left-hand side of the through line AB, then the bearing $AP_1$ will be determined by tuning in on station A and steering the airplane so that the needle will be at the zero central position. The direction of station B is now determined by tuning in on station B. If, as illustrated, station B is to the right of the bearing line $AP_1$, then the needle will deviate to the right to indicate said direction. To obtain alignment of the airplane with the line AB and maneuver the same into a position on this line so that in flying therealong it will first pass over station B and then over station A, it will be necessary that the airplane be steered to the right and at an angle $a'$ that is greater than the included angle $a$ between the bearing line $AP_1$ and the directional line $BP_1$.

This procedure may be repeated if necessary at other positions such as $P_1'$ and $P_1''$ until the angle of deviation is substantially zero when the airplane is at position $P_1'''$ with the longitudinal axis in substantial alignment with the through line AB.

Figure 6:
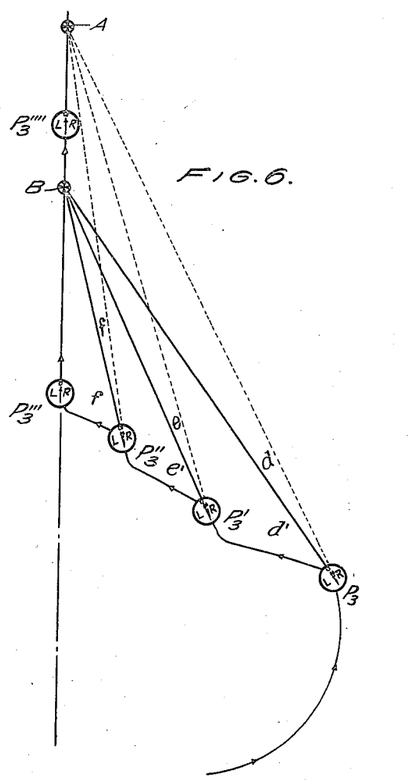
Fig. 6 is a view similar to Fig. 5 showing a path for aligning the airplane with the two stations when the airplane is positioned to the right of the line passing through the two stations.

In Fig. 6 the airplane is illustrated as being positioned to the right of the through line at $P_3$, and the direction of the one station with respect to the bearing between the airplane and the other station is determined by first tuning in station B and then tuning in station A. In this case the direction of station A and the airdrome (not shown in this view) will be to the right of the bearing lines $BP_3$, $BP_3'$ and $BP_3''$, as indicated by the deflection of the needle to the right from the zero central position of the ammeter.

Referring to Fig. 7 it will be seen that alignment of the longitudinal axis of the airplane and the two radio stations A and B may be accomplished in accordance with a further embodiment of this invention, by decreasing the angle of deviation produced for each turning of the airplane from the bearing line of one station into the direction or bearing line of the other until the angle of deviation is substantially zero.

If the airplane is tuned in on station A the path or bearing line of the airplane will be along the line $AP_5$ until it passes over station A whence station B will be tuned in and the airplane will be turned in the direction thereof and steered along the line $BP_6$ until it passes over station B. An observation is made before passing over station B on the directional gyro 18 to establish the bearing line $BP_6$ as a fixed reference. By making at least 180° turn and heading the airplane in the direction of station B, the airplane will fly on a substantially reciprocal path along the line $BP_7$ until it passes over station B. By tuning in station A and turning the airplane in the direction thereof immediately after passing over station B the angle of deviation, that is, the included angle between the bearing line $BP_7$ and the bearing line $AP_8$ will be smaller than the angle $x$. The airplane is now headed in the direction of station A and the above steps are repeated with respect to each station until the angle of deviation included between the bearing line past one station and the bearing line towards the other station is nil.

Referring to Fig. 8 it will be seen that the airplane is caused to approach the outer station with its axis in alignment with the through line of the inner and outer stations A and B. This relation is maintained until the airplane passes the outer station whence the establishment of said alignment is no longer made with reference to the two localizing station positions, but rather with respect to the inner station and a fixed directional reference on the airplane, established at the time of passing over station B. Consequently the alignment of the airplane axis will be maintained only as long as there is no lateral displacement between the fixed directional reference of the airplane and that of the ground. As shown in this view, the path of travel of the airplane is determined by the direction of the wind and by heading the airplane towards station A. The path is shown in heavy line, and the through line is shown by dot and dash. It will be observed that the airplane is gradually moved laterally off the through line by the wind and in maintaining the heading of the airplane towards the inner station, the airplane is also angularly displaced, reaching the maximum lateral and angular displacement when the heading of the airplane is in the same direction as the wind. This flight path portion is designated $F_1$ in Fig 8 and $F_3$ in Fig. 9. The pilot, of course, will at all times be able to observe the extent of the angular displacement by noting the reading of the directional gyro but he has no way of knowing the exact extent of the lateral displacement.

At the point where there is no further wind effect the airplane, still heading for the inner station, will move along a straight line portion, designated $F_2$ in Fig. 8 or $F_4$ in Fig. 9, and when it arrives within the zone established by the marker beacon A, the pilot, who has now received the signal transmitted by said marker beacon will turn the airplane to the left, and conversely to the right were the wind direction NW., until the gyro reading once again is the same as that indicated or set at the time of passing over the outer station. The airplane will now pass directly over or slightly to one side or the other thereof in the desired direction for effecting the final step in the landing process.

A variation in the process of landing when a slight displacement between the through line and direction of the wind is shown in Fig. 9. The steps in this variation of the landing process are identical to that required in connection with the showing in Figs. 2 and 4 except that, in heading from the inner station A to the outer station B prior to effecting alignment, the airplane is caused to align with the through line prior to passing over the inner station for the purpose of establishing a directional reference in space that is fixed with respect to the through line. The pilot is thus able to determine in the manner indicated in Fig. 8 the approximate direction of the wind and the extent of angular displacement of the axis of the airplane with respect to the through line. Knowing what this angular displacement is, the pilot will cause the airplane to travel on the reciprocal bearing by again establishing alignment of the axis of the airplane with the through line of the two stations and immediately after passing over the outer station, the pilot will turn the airplane about an angle approximately equal to one half the angle of said previously determined angular displacement, noting at the same time the corresponding position of the radio compass needle for this angle. If now the radio compass needle can be maintained in the relative position, which can be done when the radio compass is provided with an automatic volume control, while the axis of the airplane is held relatively fixed with respect to said last-mentioned established angle, then the airplane will obviously move along a straight line that is substantially in coincidence with the through line. The remaining steps of the process are practically the same as that described above in connection with Figs. 2 and 3.

The process of effecting a blind flight and landing is preferably accomplished in the following manner:

The airplane is caused to approach the vicinity of the airdrome with the aid of any well-known radio direction finding or radio beacon system. It is, however, preferred that the same radio receiving apparatus that is used for tuning in the two local transmitting stations A and B be also used with a longer range transmitter C that is positioned somewhere in the vicinity of the airdrome and within the range of the local transmitters. The transmitter is approached by maintaining the pointer on zero central position.

Upon arriving over the long range station the pilot tunes in the field localizing transmitter station A that is nearer the boundary and as he approaches this transmitter excess altitude is gradually lost so as to cross over this transmitter at some convenient altitude of about between 500 feet and 1000 feet. The instant of passing over this station is determined as hereinbefore indicated. If the direction of the airplane in heading towards station A is as indicated in Fig. 2, it is preferable that the airplane be steered about 180° turn and again head the same over station A prior to tuning in station B. The pilot now tunes in the other localizing transmitter station B and flies along the bearing thus determined which is in a direction opposite to that of his landing. This bearing is noted on the directional gyroscope and upon passing over the latter transmitter at least about a 180° turn is made which brings the airplane heading again into this transmitter and at an angle of deviation with respect to the through line AB that is less than the angle of deviation of the airplane with respect to said line when the first approach to station A is made. At this point in the procedure, the pilot checks his bearing to see if it is in coincidence with the line joining the two localizer stations if he is to follow the procedure for aligning the airplane with the through line AB as illustrated in Figs. 5 and 6. If the procedure is to be followed as outlined in Fig. 7 then the checking of the alignment of the airplane with the line AB will not be made until after passing over station B. The one procedure may be used as a check against the other, if desired.

With little practice the pilot is able to judge from the intensity of the signal received through his earphones that are connected to the receiver or by observing needle deviations of the receiver, or by receiving the signal transmitted by the marker beacon, of the proximity of the airplane to the stations.

Immediately upon flying over station A, station B is tuned in and if the needle has not deviated from the central zero position, the pilot knows that he is on the landing path and he notes this bearing on the directional gyroscope. The engine R. P. M. is now reduced so as to cause a gradual loss of altitude. If an altitude is reached, say 200 feet, which is known to be the minimum safe altitude for that vicinity before the boundary transmitter is reached, level flight is resumed until passing over it.

The direction from there on is maintained by means of the compass or directional gyroscope indication as previously found. The R. P. M. is reduced at approximately 1000 R. P. M. and permits holding the airplane in a level position longitudinally at an airspeed just above the minimum safe speed. The tachometer and the airspeed indicator have their dials so arranged that when the desired number of revolutions of the engine and the airspeed of the airplane is obtained, they will be in alignment with the level position of the gyro horizon. This arrangement renders any change in the desired conditions readily observable. The altimeter dial is also inverted for this purpose. The airplane settles slowly on the landing surface at a vertical rate of descent that will not produce an excessive shock for standard oleo gears. This method of landing and the indications of the altimeter are not critical as the pilot does not perform any manipulation for setting the airplane down. The altimeter indications can be in error thirty or forty feet by this method without undue harm as it is used principally for clearing the boundary transmitter and sufficient allowance is made for such errors as are likely. This means that if two-way communication with the ground should fail so that the pilot did not receive the barometric height of the landing field for setting his altimeter, he could still land acting upon information as to the barometric pressure existing at the time he left his starting point and knowing the barometer tendency.

If desired, a further localizing radio transmitting station C may be positioned in alignment with stations A and B and spaced from A in the direction of from B to A, and also a station D where high obstructions are reverse in the vicinity of the airdome.

A skilled pilot could measure the distance traveled from B to A in terms of time for the prevailing wind velocity for a given airspeed of the airplane and by applying the distance multiple of A to B to this measured time, the arrival of the airplane over position B could thus be determined and likewise the wind effect could be determined by the comparison of the actual flying time from C to A with the computed time for this given distance and given airspeed. Having determined a measure of time-distance relation from which the wind effect can be ascertained and knowing the airspeed of the airplane and the geometry of the maneuver for reversing the heading of the airplane and aligning the axis thereof with the through line, the instant of arrival over the position B can be determined with practical accuracy. The procedure for effecting the landing from the position B is as already described above.

The distance of this spacing should preferably be determined by the boundary line of the airdrome, thus allowing the airplane the maximum space within which to effect the landing. This station should have a frequency different from that of the other two stations, the difference preferably being not too great. By tuning in this station substantial alignment may be maintained after passing station A to insure a proper heading of the airplane immediately prior to and after the landing is made without the aid of the gyroscope directional indicator.

This is a continuation in part of my copending application Serial No. 663,672, filed March 30, 1933.

Having thus described my invention, what I claim as new and desire to secure by Letters Patent is:

1. The method of positioning an airplane in blind flight immediately prior to landing on an airdrome so as to glide along the hypotenuse of a predetermined virtual right triangle in a predetermined vertical plane in which two spaced radio transmitting stations of known characteristics are located, one being positioned in coincidence with the vertex of the right angle of said triangle and the other being spaced a predetermined distance therefrom and further away from the airdrome, which comprises the steps of aligning the longitudinal axis of said airplane with a straight line passing through said stations, of heading said airplane towards said airdrome along said through line, of reducing the forward speed of said airplane after passing one station and prior to reaching the other to thereby lower the altitude of said airplane to a predetermined height corresponding to the altitude of said triangle while maintaining the same in a substantially horizontal altitude and while maintaining the path of travel of the airplane in said vertical plane, of determining the instant of travel of said airplane past the station that is located at the vertex of said right angle and of setting the speed of the airplane motor and the airplane at a predetermined angle of attack to effect a landing speed of said airplane that will correspond substantially to the normal gliding speed of said airplane.

2. The method of positioning an airplane while in blind flight and prior to landing, on a predetermined course corresponding to a line passing through two radio transmitting stations of known characteristic and in a predetermined position to glide along the hypotenuse of a predetermined right triangle in a vertical plane including said course, which comprises the steps of determining the bearing of one of said stations with respect to the longitudinal axis of said airplane, of aligning the longitudinal axis of said airplane with said bearing, of determining the bearing of the other of said stations with respect to said airplane axis, of determining the approximate included angle between said bearings, of steering said airplane away from said first bearing in the direction of the second bearing if the included angle is not substantially zero, of repeating the above steps until the included angle between said bearings is substantially zero, which corresponds to the predetermined course, of lowering the forward speed of said airplane after passing one station and prior to reaching the other to thereby lower the altitude of said airplane to a predetermined height corresponding to the altitude of said triangle while maintaining the same in a substantially horizontal position and while maintaining the said course, of determining the instant of travel of said airplane past the other of said stations corresponding in position to the apex of the right angle of said triangle and of then immediately setting the speed of the airplane motor and the airplane at a predetermined angle of attack to effect a speed of said airplane that will correspond substantially to the normal gliding speed of said airplane.

3. The method of positioning an airplane while in blind flight and prior to landing, on a predetermined course corresponding to a line passing through two radio transmitting stations of known characteristics, and in a predetermined position to glide along the hypotenuse of a predetermined right triangle in a vertical plane including said course, which comprises the steps of determining the bearing of one of said stations with respect to the longitudinal axis of said airplane, of aligning the longitudinal axis of said airplane while steering toward said bearing, of determining the bearing of the other of said stations with respect to said airplane axis, of determining the approximate included angle between said bearings, of steering said airplane away from said first bearing in the direction of the second bearing if the included angle is not substantially zero, of repeating the above steps until the included angle between said bearings is substantially zero, which corresponds to the predetermined course, of lowering the forward speed of said airplane after passing one station and prior to reaching the other to thereby lower the altitude of said airplane to a predetermined height corresponding to the altitude of said triangle while maintaining the same in a substantially horizontal position and while maintaining the said course, of determining the instant of travel of said airplane past the other of said stations corresponding in position to the apex of the right angle of said triangle, and of then immediately setting the speed of the airplane motor and the airplane at a predetermined angle of attack to effect a speed of said airplane that will correspond substantially to the gliding speed of said airplane.

4. A method of aligning the longitudinal axis of an airplane, while in blind flight preparatory to making a blind landing, with a line passing through two radio transmitting stations of known characteristics by detecting and distinguishing said stations through radio means carried by said airplane, which comprises the steps of determining the direction of turning said airplane so as to head towards one of said stations, of steering said airplane towards and over said station; of determining the direction of turning said airplane for heading towards the other of said stations; of immediately thereafter steering said airplane in the direction of and to pass over said last-mentioned station, of steering said airplane for more than 180 degrees turn in the direction towards the side of the through line that forms an acute angle with the last determined path of said airplane, to cause said airplane to approach and pass over said last-mentioned station on substantially the reciprocal of said last determined heading, and, if necessary, of progressively reducing the degree of turning of said airplane after passing over each station, as the airplane is steered from one station to the other, and vice versa, until the degree of turning is substantially zero.

5. In an aircraft guiding system for effecting blind landings, an airdrome and two radio transmitting stations of different frequencies, one of said stations being positioned near the boundary of said airdrome, and having a transmitting radio frequency greater than that of the other station, the other of said stations being positioned in alignment with said first station and with a suitable point of landing on said airdrome, and spaced therefrom in an opposite direction to the direction of the point of landing with respect to said first-mentioned station a distance of sufficient length such that in reducing the forward speed of the aircraft, at a given altitude, from a normal cruising speed at a point corresponding to the second-mentioned station, to approximately a glide at a point corresponding to the first-mentioned station, the airplane will assume approximately a predetermined height at said latter station, means located adjacent each of said transmitting stations for directively propagating in an upward direction an ultra high frequency electromagnetic field of force, and ultra high frequency energy responsive means carried by the aircraft for effecting an instantaneous indication of the passage of the aircraft over each of said radio transmitting stations.

6. A method of positioning an airplane while in blind flight preparatory to landing on an airdrome so as to travel in a predetermined direction and along a predetermined line substantially coincident with a straight line between two points of reference that are horizontally spaced a predetermined distance apart, said points of reference being established by radio transmitting stations of known characteristics and being detected and distinguished by radio means carried by said airplane, which comprises the steps of determining the bearing of one of said stations with respect to said airplane, of aligning the longitudinal axis of said airplane with said bearing, of determining the direction of the other of said stations with respect to the established position of said airplane axis and if the included angle between the bearing of one station and direction of the other relative to the axis of said airplane is not zero, of steering said airplane away from said first bearing in the direction of the latter station for an angle greater than the included angle between said bearing and said determined direction, and in repeating the above said steps until the included angle between the bearing to one station and direction to the other station is substantially zero, of maintaining the axis of said airplane substantially in coincidence with the through line of said stations while moving from one station to the other and at the same time lowering the airplane from an altitude that is safe in the vicinity of the outer station by lowering its speed to a predetermined altitude and predetermined speed when in a position corresponding to the inner station.

7. A method of aligning the longitudinal axis of an airplane while in blind flight preparatory to making a blind landing with a line passing through two horizontally spaced points of reference established by radio transmitting stations of known characteristics and disposed in predetermined relation to an airdrome, said stations being detected and distinguished by radio means carried by said airplane which comprises the steps, of determining the direction of turning said airplane so as to head toward the first point of reference corresponding to said tuned in station of steering said airplane towards and over said first point of reference, of immediately thereafter determining, the direction of turning said airplane for heading towards the second point of reference corresponding to said last-mentioned station, of immediately thereafter steering said airplane in the direction of and to pass over said second point of reference, and, if the direction of said airplane is not in substantial coincidence with a straight line joining said points of reference, of reducing the degree of deviation of said air plane from said straight line between said references after passing over said last point of reference by steering said airplane to effect a turn of not less than about 180° in a direction away from the last determined direction and in a sense of direction opposite to the determined sense of direction of the second point of reference relative to the direction of travel of said airplane at the time of passing over said first point of reference and, if necessary, of repeating said steps until the degree of turning of said airplane to head from one point of reference to the other is substantially zero.

8. A method of positioning an airplane while in blind flight preparatory to landing on an airdrome so as to travel in a predetermined direction and along a predetermined line substantially coincident with a straight line between two points of reference that are horizontally spaced a predetermined distance apart, said points of reference being established by radio transmitting stations of known characteristics and being detected and distinguished by radio means carried by said airplane which comprises the steps of determining the bearing of one of said stations with respect to said airplane, of aligning the longitudinal axis of said airplane with said bearing, of determining the direction of the other of said stations with respect to the established position of said airplane axis and if the included angle between the bearing of one station and direction of the other relative to the axis of said airplane is not zero, of steering said airplane away from said first bearing in the direction of the latter station for an angle greater than the included angle between said bearing and said determined direction, and of repeating the above said steps until the included angle between the bearing to one station and direction to the other station is substantially zero, of maintaining the axis of said airplane substantially in coincidence with the through line of said stations while moving from one station to the other and at the same time lowering the airplane from an altitude that is safe in the vicinity of the outer station by reducing its speed to a predetermined altitude and predetermined speed when in a position corresponding to the inner station, and of thereafter lowering said airplane by reducing its speed to a speed corresponding to the power glide along the through line to a point of landing on said airdrome.

9. A method of positioning an airplane while in blind flight preparatory to landing on an airdrome so as to travel in a predetermined direction and along a predetermined line that is substantially coincident with a straight line between two horizontally spaced points of reference established by transmitting stations, but are disposed one more remote than the other from said airdrome and which are of known characteristics, said stations being detected and distinguished by radio means carried by said airplane which comprises the steps of determining the direction of turning said airplane so as to head toward the point of reference that is more remote from the airdrome, of steering said airplane towards and over said determined point of reference, of immediately thereafter determining the direction of turning said airplane for heading towards the closer point of reference, of immediately thereafter steering said airplane in the direction of and to pass over said last determined point of reference, and if the direction of said airplane is substantially coincident with the through line of said points of reference, of effecting a turn of said airplane so as to head in the opposite direction and substantially along the same line, and repeating said steps to obtain a heading toward said airdrome, but if after passing over the second determined point of reference the direction of said airplane is not in substantial coincidence with said through line, of reducing the degree of deviation of said airplane from said through line by effecting a turn of said airplane of not less than about 180° in a direction away from the last determined direction and in a sense of direction opposite to the determined sense of direction of the second point of reference relative to the direction of travel of said airplane at the time of passing over said first point of reference and, if necessary, of repeating said steps until the degree of turning of said airplane to head from the point of reference that is more remote from the airdrome to the point of reference that is closer to the airdrome is substantially zero.

10. A method of positioning an airplane while in blind flight preparatory to landing on an airdrome so as to travel in a predetermined direction and along a predetermined line that is substantially coincident with a straight line between two horizontally spaced points of reference established by transmitting stations, but are disposed one more remote than the other from said airdrome and which are of known characteristics and being detected and distinguished by radio means carried by said airplane, which comprises the steps of determining the direction of turning said airplane so as to head toward the point of reference that is more remote from the airdrome, of steering said airplane towards and over said determined point of reference, of immediately thereafter determining the direction of turning said airplane for heading towards the closer point of reference, of immediately thereafter steering said airplane in the direction of and to pass over said last determined point of reference, and if the direction of said airplane is substantially coincident with the through line of said points of reference, of effecting a turn of said airplane so as to head in the opposite direction and substantially along the same line, and repeating said steps to obtain a heading towards said airdrome, but if, after passing over the second determined point of reference, the direction of said airplane is not in substantial coincidence with said through line, of reducing the degree of deviation of said airplane from said through line by effecting a turn of said airplane, of not less than 180° in a direction away from the last determined direction and in a sense of direction opposite to the determined sense of direction of the second point of reference relative to the direction of travel of said airplane at the time of passing over said first point of reference and, if necessary, of repeating said steps until the degree of turning of said airplane to head from the point of reference that is more remote from the airdrome to the point of reference that is closer to the airdrome is substantially zero.

11. A method of aligning the longitudinal axis of an airplane while in blind flight preparatory to making a blind landing, with a line passing through two horizontally spaced points of reference established by radio transmitting stations of known characteristics and being detected and distinguished by radio means carried by said airplane, and disposed in predetermined relation to an airdrome, which comprises the steps of observing the direction of turning said airplane so as to head toward the first point of reference corresponding to said tuned in station, of steering said airplane towards and over said first point of reference, of immediately thereafter observing, the direction of turning said airplane for heading towards the second point of reference corresponding to said last-mentioned station, of immediately thereafter steering said airplane in the direction of and to pass over said second point of reference, and, if the direction of said airplane is not in substantial coincidence with a straight line joining said points of reference, of reducing the degree of deviation of said airplane from said straight line between said references after passing over said last point of reference by steering said airplane to effect a turn of not less than about 180° in a direction away from the last determined direction and in a sense of direction opposite to the determined sense of direction of the second point of reference relative to the direction of travel of said airplane at the time of passing over said first point of reference and, if necessary, of repeating said steps until the degree of turning of said airplane to head from one point of reference to the other is substantially zero.

12. In an aircraft guiding system for effecting blind landings, an airdrome and two radio transmitting stations of known characteristics, one of said stations being positioned near the boundary of said airdrome and the other of said stations being positioned in alignment with said first station and with a suitable point of landing of said airdrome, and spaced therefrom in an opposite direction to the direction of the point of landing with respect to said first-mentioned station a distance of sufficient length such that in reducing the forward speed of the aircraft, at a given altitude, from a normal cruising speed at a point corresponding to the second-mentioned station, to approximately a glide at a point corresponding to the first-mentioned station, the airplane will assume approximately a predetermined height at said first station and means adjacent each of said radio transmitting stations for directively propagating signals to the aircraft having a characteristic differing from the character of the signals emitted by said radio transmitting stations.

13. The method of guiding an aircraft having a radio homing device carried thereby to land on an airdrome, which comprises the steps of causing the radiation of energy, capable of penetrating atmospheric conditions of low visibility from a plurality of separate aligned sources of known characteristics and having distance relation with respect to the airdrome and the flight landing path of said aircraft, operating the homing device on the aircraft for detecting and distinguishing said sources of radiant energy, of steering said aircraft, in response first to one and then to another of said sources of such radiant energy in such manner as to indicate the direction of an assigned reference line on said aircraft with respect to the sources of said fields and said path, thereafter steering the aircraft in accordance with a zero deflection indication of said reference line with respect to each of said sources indicating on the aircraft the time of passage of the aircraft over each of the separate aligned sources of known characteristic, and setting the speed of the aircraft according to the time of passage over said sources.

14. Means for guiding an aircraft to land on an airdrome including separate spaced stations constituting sources for producing at said airdrome a plurality of fields of radiant energy of different given frequencies, the sources of the fields being disposed with relation to each other in the direction of travel of said aircraft for effecting the landing and having a given distance relation with respect to each other, to said landing field and to the landing path of said aircraft and means located adjacent each of said sources for establishing and sustaining in space electromagnetic fields of force of the same character but differing from the character of the aforesaid plurality of fields of radiant energy and coacting with said first mentioned sources.

15. Means for guiding an aircraft to land on an airdrome including separate spaced stations constituting sources for producing at said airdrome a plurality of fields of radiant energy of different given frequencies, the sources of the fields being disposed with relation to each other in the direction of travel of said aircraft immediately prior to landing and rearward of the point of landing on said airdrome and having a definite distance relation with respect to each other, to said landing field and to the landing path of said aircraft and means for directively propagating a wall of ultra high frequency energy laterally across the path of flight of the aircraft adjacent each of said sources and coacting with said aforementioned sources.

16. Means for guiding an aircraft to land on an airdrome including separate spaced means for producing at said airdrome a plurality of fields of radiant energy of different given frequencies, to be detected and distinguished by said aircraft, the sources of said fields being disposed with relation to each other in the direction of travel of said aircraft for effecting the landing and having a given distance relation with respect to each other, to said landing field and to the landing path of said aircraft, and means arranged in the vicinity of said first-mentioned means for producing a sharply defined beam or beams of radiant energy to be intercepted by said aircraft, said beam or beams each having a frequency distinguishing from the frequencies of said first mentioned fields of radiant energy and intersecting the through line of said sources at said sources respectively so that for a given altitude each line of intersection has a limit at a predetermined distance from said source to define an entrance to said beams.

17. Means for guiding an aircraft to land on an airdrome including separate spaced stations constituting sources for producing at said airdrome a plurality of fields of radiant energy of different given frequencies, the sources of said fields being disposed with relation to each other in the direction of travel of said aircraft for effecting the landing and having a definite distance relation with respect to each other, to said landing field and to the landing path of said aircraft and means for establishing and maintaining a substantially fan-shaped wall of ultra high frequency energy in a plane substantially normal to the course of flight of an aircraft over each of said stations and coacting with said sources.

18. Means for guiding an aircraft to land on an airdrome including separate spaced means for producing at said airdrome a plurality of fields of radiant energy of different given frequencies to be detected and distinguished by said aircraft, the sources of said fields being disposed with relation to each other in the direction of travel of said aircraft immediately prior to landing and rearward of the point of landing on said airdrome and having a definite distance relation with respect to each other, to said landing field and to the landing path of said aircraft, means arranged in the vicinity of the first-mentioned means for producing a sharply defined beam or beams of radiant energy to be intercepted by said aircraft and differing in character from the character of the energy emitted by said first mentioned means, said beam or beams intersecting the through line of said sources at said sources respectively, so that for a given altitude each line of intersection has a limit at a predetermined distance from said source to define an entrance to said beams, and for indicating the instant said aircraft is over said entrance.

19. In an aircraft guiding system for effecting blind landings, an airdrome, two radio transmitting stations constituting sources of energy, one of said stations being positioned near the boundary of said airdrome and the other of said stations being positioned in alignment with said first station and with suitable point of landing on said airdrome and spaced therefrom in an opposite direction to the direction of the point of landing with respect to said first-mentioned station a distance of sufficient length such that in reducing the forward speed of the aircraft, at a given altitude, from a normal cruising speed at a point corresponding to the second-mentioned station, to approximately a glide at a point corresponding to the first-mentioned station, the airplane will assume approximately a predetermined height, and means adjacent each station for producing a sharply defined beam of radiant energy to be intercepted by said aircraft, said beam intersecting the through line of said sources at said sources respectively so that for a given altitude each line of intersection has a limit at a predetermined distance from said source to define an entrance to said beam.

20. In an aircraft guiding system for effecting blind landings, an airdrome, two radio transmitting stations of different frequencies constituting sources of energy, one of said stations being positioned near the boundary of said airdrome and the other of said stations being positioned in alignment with said first station and with a suitable point of landing on said airdrome, and spaced therefrom in an opposite direction to the direction of the point of landing with respect to said first-mentioned station, a distance of sufficient length such that in reducing the forward speed of the aircraft, at a given altitude, from a normal cruising speed at a point corresponding to the second-mentioned station, to approximately a glide at a point corresponding to the first-mentioned station the airplane will assume approximately a predetermined altitude at said latter station, and means on the ground for producing a sharply defined beam of radiant energy to be intercepted by said aircraft, said beam intersecting the through line of said source at said sources respectively, so that for a given altitude each line of intersection has a limit at a predetermined distance from said source to define an entrance to said beam.

21. The method of guiding aircraft to land on an airdrome with the assistance of separate radiant energy transmitting means located in a direction of travel corresponding to the desired landing path direction of the aircraft and spaced a given distance apart to establish known geometric points of reference on the ground and to produce independent fields of radiant energy and with the assistance of means on the aircraft capable of being affected by said fields to show the direction of the source of each of said transmitting means with respect to a selected reference line on a deflectable instrument carried on said aircraft, which comprises the steps of aligning the reference line of said airplane with the through line of said reference points, alternately determining the bearings of said transmitting means through steering said aircraft to obtain successive zero deflections between said respective points of reference and said reference line until the bearing of said aircraft with respect to one transmitting means is in coincidence with that of the other, of localizing said aircraft with respect to each point of reference by detecting the corresponding fields of radiant energy, at the time of passing thereover while maintaining the established alignment and of setting said aircraft for obtaining a time-distance flight relation in flying from one known point of reference to another and adjusting the speed of the aircraft according to the time of passing over the transmitting means.

22. The method of guiding aircraft to land on an airdrome with the assistance of separate radiant energy transmitting means located in a direction of travel corresponding to the desired landing path direction of the aircraft and in a given directional relation with respect to each other and the point of landing on said airdrome, and spaced a given distance apart to establish known geometric points of reference on the ground and to produce independent fields of radiant energy and with the assistance of means on the aircraft capable of being affected by said fields to show the direction of the source of each of said transmitting means with respect to a selected reference on a deflectable instrument carried on said aircraft, which comprises the step, of orienting said aircraft with respect to the point of landing by establishing a zero deflection between one known point of reference and said reference line and thereafter determining the direction of another known point with respect to the said established zero relation, of aligning the reference line of said airplane with the through line of said reference points, alternately determining the bearings of said transmitting means through steering said aircraft to obtain successive zero deflections between said respective points of reference and said reference line until the bearing of said aircraft with respect to one transmitting means is in coincidence with that of the other, of localizing said aircraft with respect to each point of reference by detecting the corresponding fields of radiant energy, at the time of passing thereover while maintaining the established alignment and of setting said aircraft for obtaining a time-distance flight relation in flying from one known point of reference to another, and modifying the speed of the aircraft according to the time of passing over the transmitting means.

23. An aircraft blind navigation and landing system comprising in combination, a radio transmitting station located at a position spaced from the desired landing point on a landing field a distance dependent upon the desired gliding angle of the aircraft and the altitude at which the aircraft may assume said desired gliding angle, said station being operative to indicate to said aircraft the position in flight at which said gliding angle is to be commenced at the said altitude for landing at said point, and a radio compass receiver carried by the aircraft and having an indicator operative from a zero to a right or left position for visually indicating the direction of said transmitting station with respect to the position of the aircraft, said indicator being operative in response to a turning of the aircraft to reverse its direction of reading upon the aircraft passing by the radio transmitter for determining said position in flight from which to glide blind at said desired gliding angle to said landing point independently of any visual observation of said landing field.

24. The method of blind landing for an aircraft on a landing field having a radio transmitting station located at a position spaced from the desired landing point a distance dependent upon the desired gliding angle of the aircraft and the altitude at which the aircraft may commence said desired gliding angle, and said aircraft being equipped with a radio compass receiver having an indicator operative from a zero to a right or left position, which method consists in maneuvering the aircraft with reference to said radio transmitting station and landing field into a selected vertical plane of approach to the field passing through said transmitting station, swinging the aircraft in a curved path and observing the position of the indicator for determining the position in flight of said aircraft by a reversal of reading of said indicator upon said aircraft passing by said transmitting station, and setting said aircraft for descent at the desired gliding angle from the said altitude at the said position in its flight over said transmitting station independently of any visual observation of the landing field.

25. The method of blind landing an aircraft during low visibility, said aircraft being fitted with a receiver for energy waves transmitted from inner and outer ground stations positioned at selected locations relative to a landing point on an airdrome which consists in operating the receiver to receive signals from said stations, maneuvering the aircraft in accordance with the received signals to a position over the outermost of said stations such that when the aircraft passes over the outermost station it is at a preselected elevation and on a course passing through the inner and outer stations and the point on the airdrome for landing, observing by the operation of the receiver on the aircraft the instant that the aircraft is passing over the outer station, throttling the engine to a low cruising speed at a predetermined rate of descent, flying the aircraft to maintain the aircraft substantially on the line passing through the two stations and the landing point on the airdrome, observing by the operation of the receiver the instant the aircraft is passing over the inner station, throttling the engine to a glide while maintaining the longitudinal axis of the aircraft substantially on the line through the inner and outer stations, and maintaining the aircraft in a substantially horizontal landing condition until it contacts the ground.

26. In a system of navigation and blind landing for aircraft on a landing field which employs a radio transmitting station located in relation to a desired landing point on said field at a position dependent upon the optimum angle of glide of the aircraft, and said aircraft being equipped with a radio direction finder having a zero right-left indicator, the method which comprises maneuvering the aircraft with reference to said station into a vertical plane of approach passing through said station, swinging the aircraft in a curved path and determining the position in flight of the aircraft by observing the reversal of reading of said indicator when it has passed by said station, and then setting said aircraft for descent at its optimum angle of glide as determined by said point of reversal and by reference to an indication of its altitude at said point.

ALBERT F. HEGENBERGER.